United States Patent [19]

Neff

[11] 4,087,790
[45] May 2, 1978

[54] CHARACTER PRESENCE PROCESSOR

[75] Inventor: Marion Wayne Neff, Euless, Tex.

[73] Assignee: Recognition Equipment Incorporated, Dallas, Tex.

[21] Appl. No.: 826,580

[22] Filed: Aug. 22, 1977

[51] Int. Cl.² .............................................. G06K 9/18
[52] U.S. Cl. .................... 340/146.3 SG; 340/146.3 H; 340/146.3 Z
[58] Field of Search ............. 340/146.3 H, 146.3 SG, 340/146.3 Z, 146.3 R, 146.3 J; 235/61.11 E

[56] References Cited

U.S. PATENT DOCUMENTS

| | | | |
|---|---|---|---|
| 3,219,974 | 11/1965 | Rabinow ........................ | 340/146.3 S |
| 3,526,876 | 9/1970 | Baumgartner et al. .... | 340/146.3 SG |
| 3,694,807 | 9/1972 | Bond et al. ................. | 340/146.3 SG |
| 3,932,840 | 1/1976 | Hanchett ...................... | 340/146.3 Z |
| 4,045,773 | 8/1977 | Kadota et al. .............. | 340/146.3 SG |

OTHER PUBLICATIONS

Pillar et al., "Segmentation for Optical Character Recognition" *IBM Tech. Disclosure Bulletin,* vol. 13, No. 11, Apr., 1971, pp. 3335–3336.

*Primary Examiner*—Leo H. Boudreau
*Attorney, Agent, or Firm*—John E. Vandigriff; Thomas W. DeMond

[57] ABSTRACT

A method and system for automatic optical character recognition wherein a continuous flow of image data is processed at a high scan rate. A two dimensional array of self scanning photo sensors is disposed to read characters located on a writing medium. Analog outputs of the cells of the photo sensor array are converted to a continuous flow of binary signals representing character segments or the absence thereof. Feature codes are generated in a ROM to produce a multi-bit feature code characterizing unique relationships between character segments. For each row and column scanned, a representative feature code is produced with a sequence of such codes representing a complete scan of the array. The features codes are received by a decision network as they are generated by the ROM. The decision network is provided with a multiplicity of nodes, each node being accessible to every other node by a one state change to produce a representative output character code. The multiple character codes which are produced during the movement of a single character across the sensor array are processed by a decision circuit which generates a final character recognition signal. A character presence processor searches for a vertical path between character segments to indicate the presence of a character by locating the beginnings and endings of characters. For certain unique characters having vertical gaps between portions of the character a means is provided within the character presence unit to indicate that the vertical gap is to be ignored and that a character code is not to be transferred to the decision circuit.

11 Claims, 8 Drawing Figures

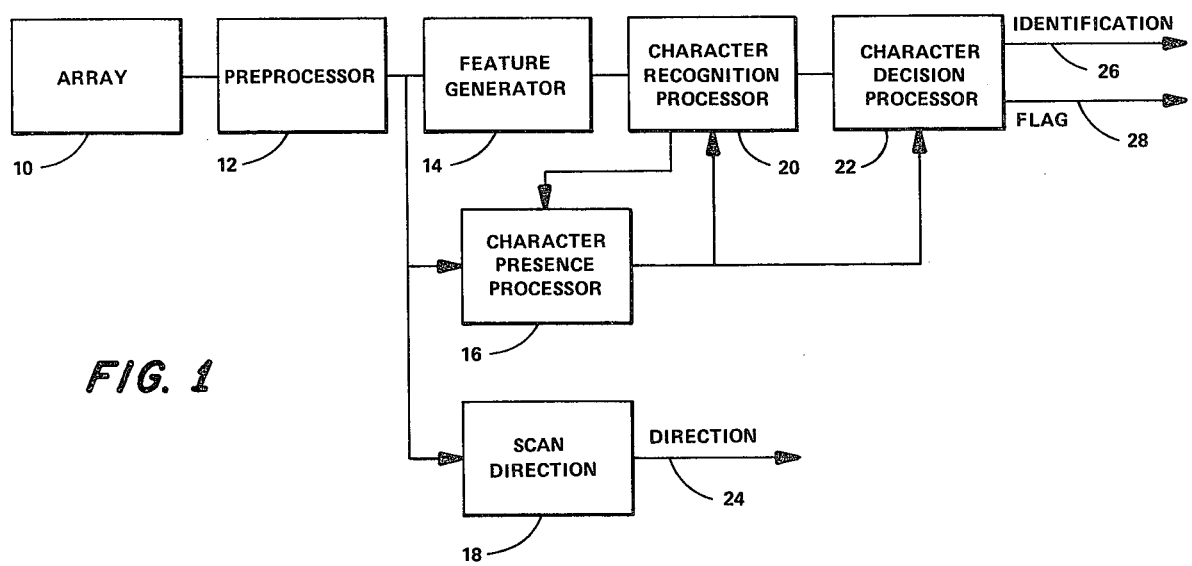
FIG. 1
FIG. 3
FIG. 4
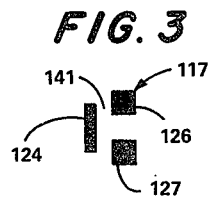
FIG. 5
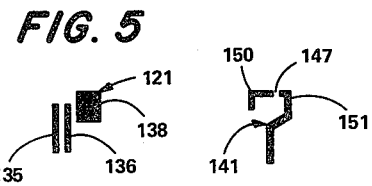
FIG. 6
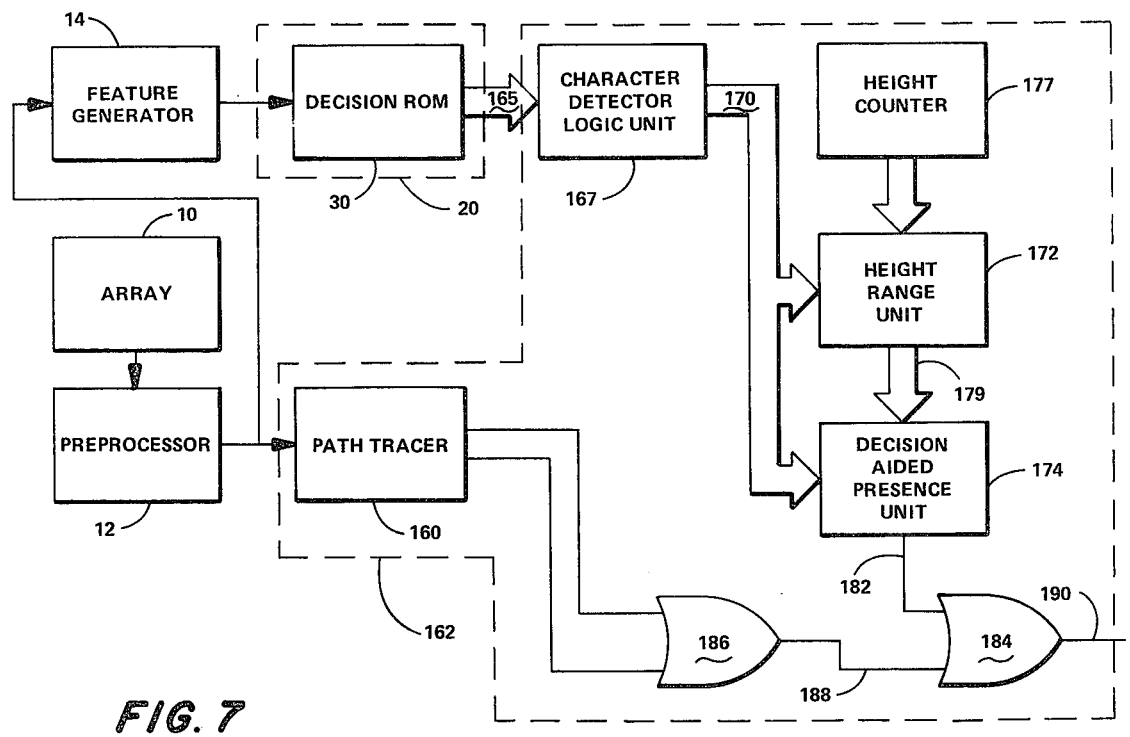
FIG. 7

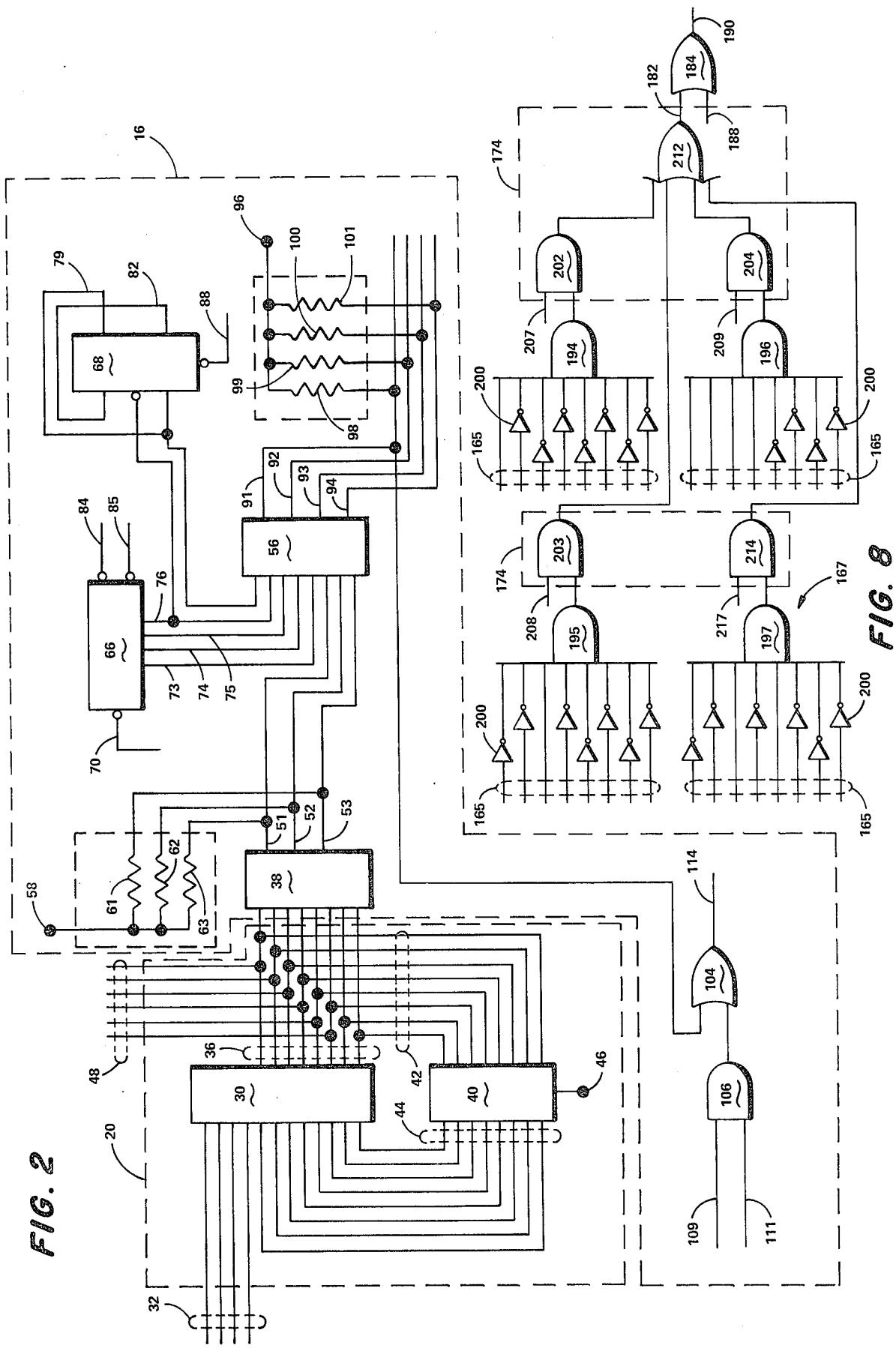

CHARACTER PRESENCE PROCESSOR

BACKGROUND OF THE INVENTION

1. Field of the Invention

This invention relates to automatic machine operations for recognition or identification of patterns, and, more particularly, the invention relates to a system to allow a character presence processor which searches for paths between character segments for character location to adapt to characters which ordinarily have vertical gaps therein and also have a weak stroke in certain characters which may appear to the character presence processor as a vertical path between character segments.

2. Description of the Prior Art

Automatic character recognition systems are usually either optical character recognition devices or magnetic ink character recognition devices or a combination thereof.

A problem which is common to both is to recognize the presence of a character at the rates present in industrial operations. Another problem is that certain characters have a tendency to have weak strokes and thus a single character may appear to the character presence detector as two characters. A weak stroke is a portion of a character which is closer to the background level than the surrounding portion of the character and, therefor, can appear as a gap in the character which the character presence processor can identify as a vertical path between character segments indicating that a character has ended and another begun. A similar problem develops with the introduction of certain fonts which have special characters. Some of these special characters have vertical gaps within the character itself and therefore a character presence processor which identifies and separates characters by finding a vertical gap between character segments identifies the portions of the character on either side of the vertical gap as a character. Thus, one character can be identified as two or more characters.

Recently, character recognition techniques have begun to incorporate a feature code generator which produces a multi-bit feature code characterizing unique relationships between line segments. As each row (or column) is scanned a feature code is produced representing the relationship between the character segments contained therein. Prior to the use of feature codes, character recognition systems utilized centering techniques to center a character in a matrix memory and then comparing the character in the matrix with a set of masks to recognize the character.

It has proved desirable to improve the reliability of character recognition at high speed rates and also to reduce the number of incorrect character decisions by providing a method and means of recognizing the presence of a weak stroke in a character and to expand the types of fonts and special characters which a feature code system can recognize. Because a character must be located, a character presence processor is usually employed to locate the character either in a memory or as shown herein within the output of a photo sensor array which is scanned at a high rate as compared with the movement of the array with respect to the characters to be read. Thus, a single character is scanned a number of times prior to passing out of the area being scanned by the array. The character presence processor locates the beginnings and endings of characters in order that it may control the utilization of the character codes produced from the feature codes.

SUMMARY OF THE INVENTION

The present invention comprises a character presence processor utilized within a character recognition system having a two dimension array of photo sensors. The array is self scanning and feature codes are generated based on the processed output of the array. A character presence processor searches for a path between character segments in a line of characters within the output of the array. The path between character segments is utilized to locate the beginnings and endings of characters as the line is scanned. The character presence processor controls the use of the output of the character recognition processor.

The photo sensors are arranged in a two dimensional array which is automatically scanned in a certain predetermined sequence, such as a row at a time beginning from the top row and proceeding through the remaining rows to the last or bottom row of the array. The analog output of the array is converted to a binary signal representing a portion of a character segment or the absence thereof by a preprocessor. The scan rate of the array is high when compared to the relative motion of the character to the array. Therefore, each character is scanned several times as its image passes through the area scanned by the array. The binary signals of a row are converted to a feature code by a feature generator at the row scan rate. The feature code is a binary word which is produced for each row and represents the unique relationship between line segments within each row. The feature codes are obtained from a list stored within the feature generator which represent certain pre-established relationships which must exist between the character segments in order that that particular feature code produced by the feature generator. The feature codes are received by a character recognition processor in which a sequential decision logic network is utilized to identify the characters based on the feature codes of an entire scan from the top to the bottom of the array. The output of the decision network is a pattern recognition signal or a character code which uniquely identifies each character of a font.

The character presence processor receives the output of the preprocessor and in addition the character presence processor receives the output of the decision network within the character recognition processor. The character presence processor allows the decision (or character recognized) by the character recognition processor to be passed to the character decision processor under certain conditions. One of the functions of the character presence processor is to examine the output of the preprocessor for the occurrance of a path between character segments through a certain number of columns of the array. The path is disposed substantially perpendicular to the direction of relative motion of the array, which is generally parallel to the line of characters. When the character presence processor senses that a character has ended and a path now exists the character presence processor so indicates to the character recognition processor and the character decision processor the character decision processor then makes a character decision based on the plurality of character codes produced by the character recognition processor. When the path is detected, a path signal is emitted by the character presence processor. The final character decision is made on the basis of which character code was generated the greatest number of times.

When the character presence processor receives a decision from the character decision processor which indicates one of a number of certain, special characters which contain spaces or paths generally perpendicular to the line of characters, the character presence processor compensates for those paths. The character presence processor, if indicated by the nature of the character codes from the character recognition processor, ignores the path. The character presence does not indicate a character beginning or ending. In other words, the path between the character segment is ignored and a final decision is made based on the entire character.

In another aspect of the invention, the character presence processor ignores the detected path between character segments if the character decision reached by the character recognition processor is such that a weak stroke or broken character situation is indicated.

BRIEF DESCRIPTION OF THE DRAWINGS

FIG. 1 is a block diagram illustrating the relationship of a self scanned photo cell array to the recognition system shown herein;

FIG. 2 is a more detailed block diagram of a portion of the character recognition processor and the character presence processor of FIG. 1;

FIG. 3 is an enlarged view of a special character of the font known as E13B;

FIG. 4 is an enlarged view of a special character of the font known as E13B;

FIG. 5 is an enlarged view of a special character of the font known as E13B;

FIG. 6 is a character of the font known as OCR-A having a gap or weak stroke therein;

FIG. 7 is a modification of the character presence processor of FIG. 2; and

FIG. 8 is a detailed logic diagram of the modification shown in FIG. 7.

DESCRIPTION OF THE PREFERRED EMBODIMENT

As shown in FIG. 1, a photo cell array 10 such as a two dimensional array is connected to a preprocessor 12. Each analog output of the plurality of photo cells of the array 10 is converted to a binary signal by preprocessor 12. The analog outputs of the array 10 are received by the preprocessor 12 serially and the binary signal output of the preprocessor is transferred serially to a feature generator 14, a character presence processor 16, and a scan direction unit 18. The scan direction unit detects the direction of the relative motion between the array 10 and characters present on a writing media which it is desired to read. The array 10 could be contained in a hand-held unit such as that described in United States Patent application, Ser. No. 505,931 by Larry L. Hilley and Marion W. Neff filed on Sept. 13, 1974 and entitled "Character Recognition Unit".

The feature generator 14 receives the binary output of preprocessor 51 representing each cell of the array. The array 10 is self scanning and is a two dimensional array composed of rows and columns. The array is scanned a row at a time from top to bottom and the serial output of preprocessor 12 follows the scanning order. Thus, the output of preprocessor 12 to feature generator 14 is the output of each photo cell across a row converted into a single binary signal. The binary signals outputted by preprocessor 12 represent character segments or the absence of thereof. For example, a logic "1" can represent the presence of a character segment or noise (if any noise is present) and a logic "0" can represent the absence of a character segment or noise. Based on the arrangement of logic "1s" and "0s" within each row the feature generator outputs a feature code at the row scan rate to character recognition processor 20.

Upon the scan of each row, a four bit feature code representative of a given feature characterized by that code is generated. In accordance with the example described herein 16 feature codes are coded as follows:

TABLE I
Feature Codes

0 = all white
1 = long line with seven or more black cells
2 = medium line in left third of array
3 = medium line in center of array
4 = medium line in right third of array
5 = vertical line segment in left third of array
6 = vertical line segment between sensors 5 and 7
7 = vertical line segment in center of array
8 = vertical line segment between sensors 7 and 9
9 = vertical line segment in right third of array
10 = wide pair of line segments
11 = narrow pair in left third of array
12 = narrow pair in center of array
13 = narrow pair in right third of array
14 = indecision between code 1 and code 15
15 = triple line segments The references to particular sensors such as those in code 6 refer to a situation in which the photo sensor array is a 12 × 38 array scanning a 12 cell row at a time. On each scan of a row 12 binary signals are outputted by a preprocessor 12 from which a four bit code is produced representing the feature set forth in Table I. The 16 features represented by the multi-bit feature code are utilized by character recognition processor 20 to produce a character code representative of a given character. The feature codes are presented to the character recognition processor at the row scan rate to be sequentially interpreted by the character recognition processor.

The output from the character recognition processor representing character decisions, in the form of a character code for each scan of the array, are applied to a character decision processor 22. The character recognition processor outputs a plurality of character codes for each character because the scan rate of the array 10 is much greater than the movement of the character relative to the array. The character decision processor 22 produces a single character code which identifies the character scanned from the flow of character codes generated by the character recognition processor. The output of the scan direction unit is connected through line 24 to an edit unit (not shown). The character code representing the final character decision of character decision processor 22 is connected through line 26 to the edit unit. The character decision processor also generates a decision complete signal or flag on line 28 which is also connected to the edit unit. The edit unit receives the final character code, the flag, and the direction signal to produce a simple phrase, or sentence as an output.

Portions of both character presence processor 16 and character recognition processor 20 are shown in FIG. 2. The four bit output of feature generator 14 is applied to a decision ROM 30 through multi-line channel 32 from feature generator 14. Output of ROM 30 is applied through channel 36 to a pass ROM 38. The output of ROM 30 is also connected to a delay buffer 40 through multi-line channel 42. The output of delay buffer 40 is connected to inputs of ROM 30 through multi-line channel 44. The delay buffer 40 receives various inputs from other portions of the character recognition processor 20 including a reset signal on terminal 46 which causes the delay buffer to be reset with an output which indicates to ROM 30 to begin a character decision. The output of the ROM 30 is also connected through multi-line channel 48 to other portions of the character recognition processor 20 and ultimately to the character decision processor.

The output of past ROM 38 to lines 51 through 53 is connected to height test ROM 56. This output indicates which height test is to be performed by ROM 56. Lines 51 through 53 also connected to a logic high voltage on terminal 58 through resistors 61 through 63, respectively. The other inputs to the high test ROM are from a high counter comprising a counter 66 and a J-K flip-flop 68. Counter 66 receives pulses on line 70 representing a row of data from the photo cell array at the row scan rate. Pulses on line 70 are counted by counter 66. Each pulse indicates a row having a character segment contained therein and any rows without any character segments until two consecutive rows without character segments are detected which indicates the bottom of the character. The count of counter 66 is transferred to ROM 56 through lines 73 through 76. Line 76 is also connected to the clock input of flip-flop 68. Flip-flop 68 is utilized to extend the capacity of the height counter an additional digit without having a counter with a carry output and an additional counter. Line 76 represents the most significant bit of counter 66. The Q output of flip-flop 68 is connected through line 79 to the K input of flip-flop 68 and ROM 56. The /Q output of flip-flop 68 is connected to the J input of flip-flop 68 through line 82. Thus, when counter 66 reaches a count of "1111" and counter 66 receives another pulse on line 70, the count of counter 66 recycles to "0000" and the output of flip-flop 68 to line 79 goes high. Thus, counter 66 has been extended by utilizing flip-flop 68 to extend height counter one bit from a four to a five bit output. Counter 66 is reset to zero by signals on lines 84 and 85, and flip-flop 68 is reset with its output to line 82 high and its output to line 79 low by a clear signal on line 88. The output of the height test ROM 56 is connected to various other portions of the character presence processor which requires height information. Height test ROM 56 has its outputs to lines 91 through 94 connected to a positive voltage on terminal 96 through resistors 98 through 101, respectively.

The output of ROM 56 to line 94 indicates that the height of the character is to short for the height test selected by pass ROM 38. The output of height test ROM 56 to line 93 indicates that the height test performed indicates that the character is within the correct parameters of height. The output of height test ROM 56 to line 92 indicates that the character is too tall for the height test selected by pass ROM 38. In addition, the output of height test ROM 56 to line 91 indicates that although the character is of the correct height it is one of a number of special characters for which the path between character segments being traced by another portion of the character presence processor 16 should be ignored. Line 91 is connected to OR gate 104. The other input to OR gate 104 is from AND gate 106 which has inputs on lines 109 and 111 from the portion of the character presence processor which determines if a path exist between character segments indicating that an end of a character exist. The characters being scanned comprise a line of characters. The tracer referred to herein is described in detail in the U.S. patent application of Larry L. Hilley and Marion W. Neff, Ser. No. 505,931 which was filed on Sept. 13, 1974 for "Character Recognition Unit". Briefly as shown in Table II, three columns of data are searched by the tracer for a path between character segments which indicates the beginning or ending of a particular character in the line of characters. The tracer only makes vertical or horizontal transfers and does not move diagonally. The columns in the example represent the center three columns of the array although other columns of the array could be utilized for the same purpose.

Table II

| A | B |
|---|---|
| 001 | 001 |
| 010 | 011 |
| 100 | 001 |
| 000 | 100 |
| 000 | 000 |
| 000 | 000 |

The tracer only moves along a row or a column and not from a particular row and column to a different row and a different column. The path searched is perpendicular to direction of motion of the character relative to the array. The array is moving along a line of characters. Sequence A represents a blocked path to the tracer because it is not possible to move down a column until a character segment is encountered (represented by logic "1s") and then move across a row to another column which also does not have a character segment therein and then proceed down that column. Sequence B represents an open path or in other words, a path between character segments which would indicate the ending or the beginning of a character. It is possible in Sequence B to move down the left most column until the fourth row from the top is encountered and then to the center column of the third row from the top and from there downward.

The results of the tracing are received by AND gate 106 through lines 109 and 111. If the signals on line 109 and 111 are high this indicates that a path between the character segments (or block path) is present AND gate 106 goes high. Therefore, OR gate 104 has a high output to line 114.

FIGS. 3, 4 and 5 represent special characters of a font known as E13B. The transit character 117, the dash 119 and the 'on us' character 121 all have vertical spaces between portions of the character. Thus, the tracer would output to either line 109 and 111 or both low signals indicating that a character had ended and there was a gap between the character segments. The height test ROM 56 for these special characters outputs a high signal to line 91 which causes OR gate 104 to go high thus indicating that the character has not ended. The low output of AND gate 106 is blocked.

The transit character 117 (FIG. 3) has a rectangular bar 124 at the left side of the character, and two squares 126 and 127 disposed to the right of the bar 124 one above the other. The E13B dash 119 (FIG. 4) has three horizontally disposed and spaced rectangles 129, 131 and 132. The two leftmost rectangles 129 and 131 are of the same height and width. The rightmost rectangle 132 is of the same height but has a smaller width than rectangles 129 and 131. The 'on us' character 121 (FIG. 5) has two thin rectangles 135 and 136 separated horizontally which are of the same height and width. A much thicker but shorter rectangular 138 is disposed partially above and to the right of the parallel rectangles 135 and 136. As the photocell array 10 scans the transit character 117, it first encounters the bar 124 or the squares 126 and 127 (depending on the direction of scan). When the gap or space 141 between the bar 124 and the two squares 126 and 127 is in registration with the three center columns of the array being monitored or traced by the tracer for a gap between character segments the signal to lines 109 and 111 goes low. However, the output of the decision ROM 30 indicates a certain decision or state and pass ROM 38 recognizes that decision or state in such a manner as to cause height test ROM 56 to output a "1" to line 91 if the height test requirement supplied by pass ROM 38 has been met.

Pass ROM 38 has required that a certain test be performed by height test ROM 56. That test determines if the count in counter 66 and flip-flop 68 is between certain minimum and maximum height requirements. The same methods are used for the dash and 'on us' character with line 91 going high for each to prevent a decision based on only a portion of the character, for example, rectangle 129 of dash 119 from being recognized as a character.

As shown in FIG. 6 an OCRA numeral "7" 141 has a weak stroke area or gap 147 effectively dividing the character into two portions 150 and 151. It is possible for the tracer to identify gap 147 as a gap between character segments, and thus result in the recognition of the portion 150 of the character as one character and portion 151 as another character. In order to solve this problem pass ROM 38 can be designed to require a height test to be performed for portion 150 which if portion 150 meets the height requirements height test ROM 56 outputs a "1" to line 91. This blocks the false path indication on lines 109 and 111 caused by gap 147.

A slightly modified version of the character presence detector disclosed herein is shown in FIGS. 7 and 8. The array 10, processor 12, and feature generator 14 are connected and operate as described above. The output of the three center columns of array ten are connected from preprocessor 12 to a path tracer 160 of a character presence processor 162. The output of feature generator 14 is connected to the decision ROM or network 30 within a character recognition processor 20 as described above. The output of decision ROM 30 is connected through a multiline channel 165 to a character detector logic unit 167. The output of character detector logic unit 167 is connected through multi-line channel 170 to a height range unit 172 and a decision aided presence unit 174. The height counter 177 which receives the begin scan signals from array 10 (through circuitry not shown) increments the counter in each time a row is scanned. The counter 177 is reset on command as discussed above in connection with height test counter 66. The output of height counter 177 is connected to height range unit 172. The output of height range unit 172 is connected through multi-line channel 179 to decision aided presence unit 174. The output of the decision aided presence unit 174 is connected through line 182 to an OR gate 184. The outputs of path tracer 160 are connected through an OR gate 186 and line 188 to an input of OR gate 184. The output of OR gate 184 is connected through line 190 to character decision processor 22 which is discussed above in connection with FIGS. 1 and 2.

As each row of digital signals representing character statements or the like thereof is received from preprocessor 12 by feature generator 14 the feature generator produces a feature code which is an input of decision ROM 30. Decision ROM 30 determines and outputs a character code in response to the feature codes of generator 14. The character code is received by the character decision processor 22 (as shown in FIG. 1) and the character detector logic unit 167 of FIG. 7. The character detector logic unit decodes the character code from decision ROM 30 and transfers that decoded information to height range unit 172 and decision aided presence unit 174 through channel 170. The character height of counter 177 is tested in the height range unit 172 to determine if it meets certain minimum and maximum requirements i.e., the height indicated by counter 177 is within a certain predetermined range for a particular character code transfered to unit 176 from ROM 30. The output of unit 167 determining which requirements (or test) is to be used.

Path tracer 160 searches the center three columns of the output of each scan from preprocessor 12 for a path between character segments as set forth above. When the outputs of path tracer 162 go low indicating that a white path exists through the three center columns of the array, the output of OR gate 186 goes low. The low output of OR gate 186 is connected through line 188 to OR gate 194 so that if line 182 goes low the output of OR gate 184 goes low. However, if one of the special characters shown in FIGS. 3, 4, and 5 are indicated by the character detector logic unit 176 line 182 is high. In that event the output of OR gate 184 remains high and the low signal from path tracer 160 is blocked. The path tracer can be constructed according to the tracer disclosed in the application of Hilley et. al., Ser. No. 505,931, filed on Sept. 13, 1974 and entitled "Character Recognition Unit".

Decision ROM 30 through channel 165 and various inverters 200 is connected to AND gates 194 through 197 (FIG. 8). (Of course, AND gates 194 through 197 do not represent all of the coding necessary within character detector logic unit 167 and are by way of example only.) AND gate 194 has its inputs connected to ROM 30 through a number of inverters 200 such a way that when the character code representing the transit character 117 of FIG. 3 is outputted, AND gate 194 goes high. Similarly, AND gate 195 goes high if the dash symbol is indicated by decision ROM 30. AND gate 196 goes high if the 'on-us' character 121 is indicated by decision ROM 30. The outputs of AND gates 194 through 195 are connected as inputs to AND gates 202 through 204, respectively. The other inputs to AND gates 202 through 204 are connected through lines 207 through 209, respectively, which are lines within channel 179 in FIG. 7, to height range unit 172. The signals from the range unit to lines 207 through 209 go high when a particular character meets the height code test associated therewith. For example, the output of AND gate 195 is high indicating that a dash character is being scanned by array 10 and if the dash meets the height requirements AND gate 203 goes high. AND gates 202 through 204 are connected through an OR gate 212 to OR gate 184. The function of OR gate 184 is set forth above. In order to compensate or correct for characters which are known to often have weak strokes in a known location additional AND gates such as 197 can be provided. The output of NAND gate 197 (or other NAND gates as provided) is connected to an AND gate 214 which is also connected as an input to OR gate 212. For example, AND gate 197 could be connected to channel 165 such that when a character code representing a '7' as shown in FIG. 6 is transferred from ROM 30, the low signal on line 188 is compensated for by the high signal on line 182 produced from AND gate 214 if the line 217 from height range unit 212 is high. Line 217 is high if the character meets the height test. Thus, the false gap or path between character segments indicated by the path tracer 160 is blocked and the character is correctly identified if it meets the height range unit requirements. The output of OR gate 184 to line 190 would be connected to the remainder of the system in the same manner as the output of OR gate 104 to line 114 (FIG. 2).

In summary, a recognition system is shown having a continuous flow of video data generated by a photocell array. The digitalized output of the two dimension photocell array is applied at the scan rate to a character recognition system. A feature code generator receives the data at the scan rate. Feature codes are generated and applied to a sequential decision network at the row scan rate. The sequential decision network outputs a feature code based on the character segments observed in each row of data. A decision network receives the feature codes at the row scan rate and makes a character decision i.e., generates a character code, based on the feature codes. Operating in connection with the sequential decision network are logic circuits which distinguish between characters in a line being scanned or symbols, fragments, and spaces or gaps between character segments for enhancing recognition reliability.

As a given character image moves relative to the photocell array, it is repeatedly scanned and a final character decision is made after the image has passed from the field of view on the basis of character identification code generated the greatest number of times. Scan direction data is transferred concurrent with the final character decision.

Some characters have weak strokes or gaps therein and in certain fonts such as E13B special characters have spaces or gaps between portions of the character which can cause the character to be identified as more than one character. In accordance with the invention a means for recognizing certain weak stroke conditions and certain special characters is provided in order that the vertical gap or space between portions of the character or between portions of a character divided by the weak stroke or gap are ignored and the character decision made is based on the entire character.

Having described the invention in connection with certain specific embodiments thereof, it is to be understood that further modifications may now suggest themselves to those skilled in the art and it is intended to cover such modifications as fall within this scope of the appended claims.

What is claimed is:

1. A character recognition unit for recognizing characters located on a writing medium, said characters including certain characters having gaps substantially perpendicular to the direction of relative motion between said characters and a two dimensional photocell array, said array being scanned by rows in a known sequence to produce a plurality of digital signals corresponding to character segments representing said characters on said writing medium comprising:
   a. a feature code generator receiving said digital signals and producing a feature code at the row scan rate representing certain predetermined relationships between character segments in each row;
   b. a recognition means receiving said feature code at the row scan rate to produce a pattern recognition signal for each scan of said array; and
   c. a character presence processor in communication with said recognition means and receiving said digital signals for locating a gap extending between said character segments through each scan of said array, said processor generating a path signal to recognition means when said gap is detected, said gaps extending substantially perpendicular to the direction of relative motion between the characters and said array, said presence processor including means responding to certain pattern recognition signals of said recognition means for blocking said path signal when a pattern of recognition signal indicates one of said certain characters.

2. Character recognition unit as set forth in claim 1 wherein said certain characters includes special characters having gaps and characters having weak strokes appearing as gaps at known locations therein.

3. Character recognition unit as set forth in claim 1 wherein said array is arranged in rows and columns and said character presence processor receives digital signals corresponding to certain columns of said array as each row is scanned.

4. Character recognition unit as set forth in claim 3 wherein said certain columns are located adjacent the center of said array.

5. Character recognition unit as set forth in claim 3 wherein said character presence processor produces said path signal after detecting a path of gaps between character segments through said certain columns, said path being traced through said certain columns by shifts across rows and by shifts along columns in one direction without shifts simultaneously involving both rows and columns.

6. A character recognition unit for recognizing characters on a writing medium including certain characters having gaps therein, said unit receiving digital signals representing outputs of a two dimensional array of photo sensors, said array being scanned by rows in a known sequence, said digital signals corresponding to character segments of said characters observed by said array comprising;
   (a) a feature code generator receiving said digital signals and producing feature codes at the row scan rate representing certain predetermined relationships between character segments in each row;
   (b) a recognition means receiving said feature codes to produce a character code for each scan of said array;
   (c) a character presence processor in communication with said recognition means for locating beginnings and endings of characters within each scan of said array, said character presence processor locating gaps between said character segments extending through rows of digital signals of each scan of said array for producing a path signal in response to said gap; and (d) means responsive to certain character codes of said recognition means for blocking said path signal when a pattern recognition signal indicates a portion of said certain characters.

7. Character recognition unit as set forth in claim 6 wherein said certain characters includes special characters and characters having weak strokes appearing frequently at known locations as gaps therein.

8. Character recognition unit as set forth in claim 6 wherein said array is arranged in columns and rows and said character presence processor receives the digital signals representing only certain columns as each row is scanned.

9. Character recognition unit as set forth in claim 8 wherein said certain columns are located about the center of said array.

10. Character recognition unit as set forth in claim 9 wherein said character presence processor produces said path signal after detecting a path of gaps between said character segments through said certain columns, said path comprising only shifts across rows and along columns without shifts comprising both a shift between one of said rows and a shift between one of said columns.

11. In a character recognition unit receiving analog outputs of a two dimensional array of sensors, which is arranged into rows and columns, being scanned through the columns a row at a time, a preprocessor producing a binary signal for each analog output, a feature generator receiving said binary signals for each row as scanned and producing a code from a established list of feature codes representing certain predetermined relationships between character segments therein, a recognition means receiving feature codes produced by said feature generator to produce a character code from a unique sequence of feature codes during each scan of said array, the improvement comprising: a character presence processor examining the occurrence of gaps in said character segments to determine if a path between character segments exists in certain predetermined columns, said character presence detector emitting a path signal if said path exists, said character presence detector including a height test means connected to said recognition means to determine if character segments extend over a certain predetermined number of columns as determined from each character code, said height test means producing a special signal to block said path signal for certain character codes.

* * * * *